United States Patent
Cheng et al.

(10) Patent No.: US 11,158,905 B2
(45) Date of Patent: Oct. 26, 2021

(54) COATING SLURRIES FOR PREPARING SEPARATORS, SEPARATORS FOR ELECTROCHEMICAL DEVICES AND PREPARATION METHODS THEREFOR

(71) Applicant: SHANGHAI ENERGY NEW MATERIALS TECHNOLOGY CO., LTD., Shanghai (CN)

(72) Inventors: Alex Cheng, Shanghai (CN); Honggui Deng, Shanghai (CN); Yongle Chen, Shanghai (CN); Fangbo He, Shanghai (CN); Hui Chen, Shanghai (CN)

(73) Assignee: SHANGHAI ENERGY NEW MATERIALS TECHNOLOGY CO., LTD., Shanghai (CN)

( * ) Notice: Subject to any disclaimer, the term of this patent is extended or adjusted under 35 U.S.C. 154(b) by 689 days.

(21) Appl. No.: 16/086,595

(22) PCT Filed: May 10, 2018

(86) PCT No.: PCT/CN2018/086386
§ 371 (c)(1),
(2) Date: Sep. 19, 2018

(87) PCT Pub. No.: WO2018/205980
PCT Pub. Date: Nov. 15, 2018

(65) Prior Publication Data
US 2021/0218111 A1    Jul. 15, 2021

(30) Foreign Application Priority Data

May 11, 2017 (CN) .......................... 201710329530.4

(51) Int. Cl.
| | |
|---|---|
| H01M 4/02 | (2006.01) |
| H01M 50/446 | (2021.01) |
| H01M 50/403 | (2021.01) |
| H01M 50/426 | (2021.01) |
| H01M 50/431 | (2021.01) |
| C09D 127/16 | (2006.01) |
| C08K 3/22 | (2006.01) |

(52) U.S. Cl.
CPC ........ *H01M 50/446* (2021.01); *C09D 127/16* (2013.01); *H01M 50/403* (2021.01); *H01M 50/426* (2021.01); *H01M 50/431* (2021.01); *C08K 3/22* (2013.01); *C08K 2003/2227* (2013.01)

(58) Field of Classification Search
CPC ...................................................... H01M 4/02
See application file for complete search history.

(56) References Cited

U.S. PATENT DOCUMENTS

2006/0088762 A1* 4/2006 Okamoto ............ H01M 50/183
429/142
2008/0292969 A1* 11/2008 Mori ....................... H01M 4/13
429/303

* cited by examiner

*Primary Examiner* — Jacob B Marks
(74) *Attorney, Agent, or Firm* — WPAT, PC

(57) ABSTRACT

Disclosed are a coating slurry for preparing a separator for an electrochemical device, comprising at least one polymer having an intrinsic viscosity ranging from 0.5 to 3.0 mL/g, at least one inorganic filler, and at least one solvent; a method for preparing the coating slurry; and a method for preparing a separator for an electrochemical device using the coating slurry; as well as a separator and an electrochemical device comprising the separator.

20 Claims, No Drawings

COATING SLURRIES FOR PREPARING SEPARATORS, SEPARATORS FOR ELECTROCHEMICAL DEVICES AND PREPARATION METHODS THEREFOR

CROSS REFERENCE TO RELATED APPLICATION

The present application claims the benefit of priority to Chinese Application No. 201710329530.4, filed on May 11, 2017.

TECHNICAL FIELD

The present disclosure relates to electrochemistry field, and especially relates to coating slurries for preparing separators, separators for electrochemical devices, electrochemical devices comprising the separator, and preparation methods therefor.

BACKGROUND

With the growing market of energy storage, batteries and other forms of electrochemical devices are given more and more attentions. For example, lithium secondary batteries have been extensively used as energy sources in, for example, mobile phones, laptops, power tools, electrical vehicles, etc.

An electrode assembly of an electrochemical device usually comprises a positive electrode, a negative electrode, and a permeable membrane (i.e., separator) interposed between the two electrodes. The positive electrode and the negative electrode are prevented from being in direct contact with each other by the separator, thereby avoiding internal short circuit. In the meanwhile, ionic charge carriers are allowed to pass the separator so as to close the circuit during the passage of current. Separator is a critical component in an electrochemical device because its structure and property considerably affect the performances of the electrochemical device, e.g., internal resistance, energy density, power density, cycle life, and safety.

A separator is generally formed by a polymeric microporous membrane. Commercial polyolefin-based separators offer the advantage of low cost, favorable chemical stability and excellent mechanical strength. However, they may have poor wetting characteristics in liquid electrolytes, bad adhesive property and low melting temperatures, leading to low electrolyte uptake, poor conductivity and fracture under high temperature. Various techniques for improving the chemical and physical properties of polyolefin-based separators have been disclosed, including a technique of forming a porous coating layer comprising an adhesive polymer and/or an inorganic particle on a polyolefin microporous membrane. The coating slurry formulation and the coating process play an important role in modifying the properties (e.g., adhesion) of coated separator product. There is still a need to continuously develop an advanced coated separator with improved properties, such as adhesion, and preparation methods therefor.

SUMMARY OF THE INVENTION

The present disclosure provides a coating slurry for preparing a separator for an electrochemical device. Specifically, the coating slurry disclosed herein comprises at least one polymer having an intrinsic viscosity ranging from 0.5 to 3.0 mL/g, at least one inorganic filler, and at least one solvent.

The present disclosure further provides a method for preparing the coating slurry disclosed herein. Specifically, the method for preparing the coating slurry disclosed herein comprises: preparing a mixture comprising the at least one polymer, the at least one inorganic filler, and the at least one solvent whose temperature ranging from 40° C. to 50° C.; and shearing the mixture to form a coating slurry.

The present disclosure further provides a method for preparing a separator for an electrochemical device using the coating slurry disclosed herein. Specifically, the method for preparing a separator comprises: preparing a coating slurry disclosed herein using the method set forth above; applying the coating slurry on at least one surface of a porous base membrane to form a wet coating layer; and removing the at least one solvent from the wet coating layer to form a coating layer.

The present disclosure further provides a separator for an electrochemical device prepared by the method disclosed herein. Specifically, the separator comprises a porous base membrane and a coating layer being formed on at least one surface of the porous base membrane, wherein the coating layer is formed using the coating slurry disclosed herein.

The present disclosure further provides an electrochemical device, which comprises a positive electrode, a negative electrode, and the separator disclosed herein interposed between the positive electrode and the negative electrode.

DETAILED DESCRIPTION

The present disclosure provides some exemplary embodiments of a coating slurry for preparing a separator for an electrochemical device. In one embodiment of the present disclosure, the coating slurry comprises at least one polymer, at least one inorganic filler, and at least one solvent, wherein the at least one polymer has an intrinsic viscosity ranging, for example, from 0.5 to 3.0 mL/g, such as from 0.9 to 3.0 mL/g. Intrinsic viscosity [η] is the ratio of a polymer solution's specific viscosity to the concentration of the polymer, extrapolated to zero concentration. Intrinsic viscosity is one of the most commonly used parameters to characterize a polymer and it reflects the capability of the polymer in solution to enhance the viscosity of the solution. Intrinsic viscosity [η] is defined as:

$$[\eta] = \lim_{\phi \to 0} \frac{\eta - \eta_0}{\eta_0 \phi}$$

wherein: $\eta$ is the viscosity of the polymer solution, $\eta_0$ is the viscosity in the absence of the solute, i.e., polymer, and $\Phi$ is the volume fraction of the polymer in the solution. The unit of intrinsic viscosity [η] can be deciliters per gram (dL/g) or milliliter per gram (mL/g). In general, the intrinsic viscosity of linear polymer is related to the molecular weight or degree of polymerization. With linear polymer, the viscosity measurements can provide a method for rapid determination of molecular weight when the relationship between viscosity and molecular weight has been established. A practical method for the measurement of intrinsic viscosity is using a capillary tube viscometer, such as Ubbelohde viscometer. In addition, the at least one polymer may have a density ranging, for example, from 1.5 to 2.0 g/cm, such as from 1.55 to 1.95 g/cm. In some embodiments, the at least one polymer may have a melting point ranging, for example, from 150° C. to 200° C., such as from 155° C. to 195° C. The density and melting point of the at least one polymer can be measured by a commonly known method in the art. For example, the density of the at least one polymer can be measured by a specific density device or a water displacement method. The melting point of the at least one polymer can be measured by, for example, a differential scanning calorimetry (DSC).

As used in the present disclosure, the term "slurry" means a mixture of ingredients with at least one solvent. For example, the coating slurry disclosed herein can be a suspension, as it contains the at least one inorganic filler dispersed in the at least one solvent.

In some embodiments, the coating slurry may comprise, for example, from 1 wt % to 25 wt %, such as from 1.5 wt % to 20 wt/o, of the at least one polymer, relative to the total weight of the coating slurry.

In some embodiments, the coating slurry may comprise, for example, from 1 wt % to 50 wt %, such as from 3 wt % to 15 wt %, of the at least one inorganic filler, relative to the total weight of the coating slurry.

The weight ratio of the at least one polymer and the at least one inorganic filler present in the coating slurry disclosed herein may be controlled in a specified range, as it may affect the pore structure (e.g., pore size, uniformity of pores), porosity, thickness and weight of the coating layer formed from the coating slurry. In some embodiments, the at least one polymer and the at least one inorganic filler in the coating slurry may have a weight ratio ranging, for example, from 2:1 to 1:50, such as from 2:1 to 1:10, further such as from 1:1 to 1:10.

Different types of the at least one polymer in the coating slurry may affect the adhesion of the coating layer formed from the coating slurry. In some embodiments of the present disclosure, the at least one polymer in the coating slurry may be a polyvinylidene fluoride (PVDF)-based polymer, including PVDF homopolymer and/or PVDF copolymer. Examples of PVDF copolymer include polyvinylidene fluoride-co-hexafluoropropylene (PVDF-co-HFP), polyvinylidene fluoride-co-tetrafluoroethylene (PVDF-co-TFE), and mixtures thereof.

Different types and amounts of the at least one inorganic filler in the coating slurry can affect the heat-resistance of the separator prepared from the coating slurry, thereby further preventing short circuit and improving dimensional stability of an electrochemical device employing the separator at a high temperature. Furthermore, the presence of the inorganic filler may also affect, for example, the formation of pores in the coating layer, the increase of the physical strength of the coating layer, and the increase in an impregnation rate of a liquid electrolyte.

Various inorganic particles can be used as the at least one inorganic filler in the coating slurry, including, for example, oxides, hydroxides, sulfides, nitrides, carbides, carbonates, sulfates, phosphates, titanates, and the like, comprising at least one of metallic and semiconductor elements, such as Si, Al, Ca, Ti, B, Sn, Mg, Li, Co, Ni, Sr, Ce, Zr, Y, Pb, Zn, Ba, and La. Examples of the at least one inorganic filler include alumina ($Al_2O_3$), boehmite ($\gamma$-AlOOH), silica ($SiO_2$), zirconium dioxide ($ZrO_2$), titanium oxide ($TiO_2$), cerium oxide ($CeO_2$), calcium oxide (CaO), zinc oxide (ZnO), magnesium oxide (MgO), lithium nitride ($Li_3N$), calcium carbonate ($CaCO_3$), barium sulfate ($BaSO_4$), lithium phosphate ($Li_3PO_4$), lithium titanium phosphate (LTPO), lithium aluminum titanium phosphate (LATP), cerium titanate ($CeTiO_3$), calcium titanate ($CaTiO_3$), barium titanate ($BaTiO_3$), and lithium lanthanum titanate (LLTO). In addition, the at least one inorganic filler disclosed herein may have an average particle size ranging, for example, from 0.1 to 20 μm, such as from 0.1 to 10 μm.

The at least one solvent used in the coating slurry depends on the type of the at least one polymer used to form the coating slurry. For example, the at least one solvent may have a solubility parameter similar to that of the at least one polymer to be dissolved, and a low boiling point, because such solvent can facilitate uniform mixing and coating process and needs to be removed in the following operation. The at least one solvent that may be used herein may be an organic solvent chosen, for example, from N-methyl pyrrolidone (NMP), dimethylacetamide (DMAC), N,N-dimethylformamide (DMF), dimethyl sulfoxide (DMSO), acetone, diethyl ether, propyl ether, cyclohexane, and tetrahydrofuran (THF).

The present disclosure further provides some exemplary embodiments of a method for preparing the coating slurry disclosed herein. In one embodiment, the method for preparing the coating slurry disclosed herein comprises:

(A) preparing a mixture comprising the at least one polymer, the at least one inorganic filler, and the at least one solvent; and (B) shearing the mixture.

In the step (A), any suitable techniques may be used to dissolve the at least one polymer and/or to disperse the at least one inorganic filler in the at least one solvent, for example, stirring the mixture, raising the temperature of the at least one solvent before mixing with the at least one polymer and the at least one inorganic filler, or raising the temperature of the mixture before shearing it. As an example, the temperature of the at least one solvent may be raised to a point ranging from 40° C. to 50° C., such as from 40° C. to 45° C., before mixing with the at least one polymer.

In the step (A), the mixture may be prepared by the following steps:

(A1) adding the at least one polymer into the at least one solvent to obtain a first mixture;

(A2) adding the at least one inorganic filler into the first mixture to obtain a second mixture; and The first mixture comprising the at least one polymer and the at least one solvent prepared in the step (A1) may be stirred to enhance the solubility of the at least one polymer in the at least one solvent. In one embodiment, the at least one polymer may be fully dissolved in the at least one solvent. In some embodiments, the first mixture may be vacuum pumped to reach a vacuum degree of, for example, not higher than 0.01 MPa, such as not higher than 0 MPa. In some embodiments, two or more times of vacuum pumping the first mixture may be performed. For example, a first time of vacuum pumping the first mixture to a vacuum degree of −0.05 MPa; stirring the first mixture after the first time of vacuum pumping; and a second time of vacuum pumping the first mixture to a vacuum degree of 0.01 MPa.

The second mixture prepared in the step (A2) may be stirred to disperse the at least one inorganic filler in the at least one solvent uniformly. In some embodiments, the second mixture may be vacuum pumped to reach a vacuum degree of, for example, not higher than 0.01 MPa, such as not higher than 0 MPa. In some embodiments, two or more times of vacuum pumping the second mixture may be performed. For example, a first time of vacuum pumping the second mixture to a vacuum degree of −0.05 MPa; stirring the second mixture after the first time of vacuum pumping; and a second time of vacuum pumping the second mixture to a vacuum degree of 0 MPa.

In the step (B), the mixture may be sheared to obtain a highly uniform mixture in one embodiment.

In some embodiments, the method for preparing the coating slurry may further comprise:

(C) passing the mixture through a sieve after shearing the mixture. The size of the sieve ranges, for example, from 150 to 220 mesh.

The present disclosure further provides some exemplary embodiments of a method for preparing a separator for an electrochemical device using the coating slurry disclosed above. In one embodiment, the method for preparing a separator for an electrochemical device comprises:

(E) preparing a coating slurry using the method disclosed above;

(F) applying the coating slurry onto at least one surface of a porous base membrane to form a wet coating layer; and (G) removing the at least one solvent from the wet coating layer to form a coating layer.

In the step (E), a coating slurry comprising the at least one polymer, at least one inorganic filler, and the at least one solvent may be prepared using the method disclosed above.

In the step (F), any method known in the art may be used to coat the porous base membrane with the coating slurry prepared in the step (E), such as roller coating, spray coating, dip coating, spin coating, or combinations thereof. Examples of the roller coating may include micro-gravure coating, silk screen coating, and slot die coating. Additionally, when the coating slurry is coated onto the porous base membrane, either or both surfaces of the porous base membrane may be coated.

In the step (G), the at least one solvent can be removed from the coated base membrane through a method known in the art, such as a thermal evaporation, a vacuum evaporation, a phase inversion process, or combinations thereof. In some embodiments, the at least one solvent may be removed through a thermal evaporation. For example, the coated base membrane may be placed in an oven having a temperature, for example, ranging from 70° C. to 90° C., such as 80° C., so as to evaporate the at least one solvent. In some other embodiments, the at least one solvent may be removed through a combination of thermal evaporation and vacuum evaporation. For example, the coated base membrane may be placed in a vacuum oven having a temperature, for example, ranging from 50° C. to 80° C., such as 80° C., and a vacuum degree of ranging from 0 to 95 kPa, so as to evaporate the at least one solvent. Phase inversion process is an alternative method to remove the at least one solvent, which may be initiated by immersing the coated base membrane in a poor solvent or non-solvent of the at least one polymer, such as water (e.g., deionized water), alcohols (e.g., ethanol), or combinations thereof. In the poor solvent or non-solvent, polymer-polymer self-interactions are preferred, and the polymer coils may contract and eventually precipitate. The poor solvent or non-solvent can precipitate the at least one polymer from the coating slurry, thereby forming a coating layer on the at least one surface of the porous base membrane. In an example, the coated base membrane may be immersed in water, so that the at least one solvent can be dissolved into water. Residues of the at least one solvent and/or the poor solvent may be removed by any method known in the art, for example, heating or vacuum drying. As a result, a coating layer that is dry can form on at least one surface of the porous base membrane. The at least one inorganic filler may be embedded in the coating layer and fixed by the at least one polymer.

Further disclosed herein are some exemplary embodiments of separators for electrochemical devices prepared by the methods disclosed above. The separator for an electrochemical device may comprise a porous base membrane and a coating layer being formed on at least one surface of the porous base membrane.

The coating layer disclosed herein may have a pore structure allowing gas, liquid, or ions pass from one surface side to the other surface side of the coating layer. The average pore size of the pores within the coating layer may range, for example, from 0.1 to 5 μm, such as from 1 to 3 μm. The porosity of the coating layer may range, for example, from 30% to 70%, such as from 40% to 60%. The coating layer may have an air permeability ranging, for example, from 0 to 150 sec/100 ml, such as from 10 to 50 sec/100 ml. Additionally, there is no particular limitation in the thickness of the coating layer. The coating layer disclosed herein may have a thickness ranging, for example, from 1 to 5 μm, such as from 1 to 3 μm.

The porous base membrane disclosed herein may have a thickness ranging, for example, from 3 to 20 μm, such as from 9 to 12 μm. The porous base membrane may have numerous pores inside, through which gas, liquid, or ions can pass from one surface side to the other surface side.

In some embodiments of the present disclosure, polyolefin-based porous membranes are used as the porous base membrane. Examples of polyolefin contained in the polyolefin-based porous membrane may include polyethylene (PE), high density polyethylene (HDPE), polypropylene (PP), polybutylene, polypentene, polymethylpentene (TPX), copolymers thereof, and mixtures thereof. The polyolefin disclosed herein may have a weight average molecular weight ($M_w$) ranging, for example, from 50,000 to 2,000,000, such as from 100,000 to 1,000,000. The pores within the polyolefin-based porous base membrane may have an average pore size ranging, for example, from 20 to 70 nm, such as from 30 to 60 nm. The polyolefin-based porous base membrane may have a porosity ranging, for example, from 25% to 50%, such as from 30% to 45%. Furthermore, the polyolefin-based porous base membrane may have an air permeability ranging, for example, from 50 to 400 sec/100 ml, such as from 80 to 300 sec/100 ml. In addition, the polyolefin-based porous membrane may have a single-layer structure or a multi-layer structure. A polyolefin-based porous membrane of the multi-layer structure may include at least two laminated polyolefin-based layers containing different types of polyolefin or a same type of polyolefin having different molecular weights. The polyolefin-based porous membrane disclosed herein can be prepared according to a method known in the art, or can be purchased directly in the market.

In some embodiments, a non-woven membrane may form at least one portion of the porous base membrane. The term "non-woven membrane" means a flat sheet including a multitude of randomly distributed fibers that form a web structure therein. The fibers generally can be bonded to each other or can be unbonded. The fibers can be staple fibers (i.e., discontinuous fibers of no longer than 10 cm in length) or continuous fibers. The fibers can comprise a single material or a multitude of materials, either as a combination of different fibers or as a combination of similar fibers each comprised of different materials. Examples of the non-woven membrane disclosed herein may exhibit dimensional stability, i.e., thermal shrinkage of less than 5% when heated to 100° C. for about two hours. The non-woven membrane may have a relatively large average pore size ranging, for example, from 0.1 to 20 μm, such as from 1 to 5 μm. The non-woven membrane may have a porosity ranging, for example, from 40% to 80%, such as from 50% to 70%. Furthermore, the non-woven membrane may have an air permeability of, for example, less than 500 sec/100 ml, such as ranging from 0 to 400 sec/100 ml, and further such as ranging from 0 to 200 sec/100 ml. Some examples of the non-woven membrane are formed of one chosen from polyethylene (PE), high density polyethylene (HDPE), polypropylene (PP), polybutylene, polypentene, polymethylpentene (TPX), polyethylene terephthalate (PET), polyamide, polyimide (PI), polyacrylonitrile (PAN), viscose fiber, polyester, polyacetal, polycarbonate, polyetherketone (PEK), polyetheretherketone (PEEK), polybutylene terephthalate (PBT), polyethersulfone (PES), polyphenylene oxide (PPO), polyphenylene sulfide (PPS), polyethylene naphthalene (PEN), cellulose fiber, copolymers thereof, and mixtures thereof. In an example, a non-woven membrane formed of PET is used as the porous base membrane. The non-woven porous membrane disclosed herein can be prepared according to a method known in the art, such as electro-blowing, electro-spinning, or melt-blowing, or can be purchased directly in the market.

In some embodiments, the separator may have a two-layer structure when only one surface of the porous base membrane is coated with the coating layer disclosed herein. In some other embodiments, the separator may have a three-layer structure when both surfaces of the porous base membrane are coated with the coating layer disclosed herein, or, one surface of the porous base membrane is coated with the coating layer disclosed herein, and the other surface of the porous base membrane is coated with a different coating layer. The different coating layer may comprise an adhesive polymer (e.g., PVDF), a heat-resistant polymer (e.g., meta-aramid or para-aramid), and/or an inorganic particles chosen, for example, from alumina, boehmite, silica, zirconium dioxide, and titanium oxide.

There is no particular limitation for the thickness of the separator disclosed herein, and the thickness of the separator can be controlled in view of the requirements of electrochemical devices, e.g., lithium-ion batteries.

The separator disclosed herein has a coating layer comprising at least one polymer having an intrinsic viscosity ranging from 0.5 to 3.0 mL/g and at least one inorganic filler. Because of the presence of the at least one polymer in the coating layer, the separator can have excellent adhesive property and good contact interface with the electrodes. Because of the presence of the at least one inorganic filler in the coating layer, the separator can have high porosity and improved heat-resistance. Thus the electrochemical devices employing the separator disclosed herein may have improved mechanical strength, low internal resistance, improved cycle performance and safety. The separators disclosed herein can have a wide range of applications and can be used for making high-energy density and/or high-power density batteries in many stationary and portable devices, e.g., automotive batteries, batteries for medical devices, and batteries for other large devices.

Further, the present disclosure provides embodiments of an electrochemical device. The electrochemical device comprises a positive electrode, a negative electrode, and a separator disclosed herein that is interposed between the positive electrode and the negative electrode. An electrolyte may be further included in the electrochemical device of the present disclosure. The separator is sandwiched between the positive electrode and the negative electrode to prevent physical contact between the two electrodes and the occurrence of a short circuit. The porous structure of the separator ensures a passage of ionic charge carriers (e.g., lithium ions) between the two electrodes. In addition, the separator may also provide a mechanical support to the electrochemical device. Such electrochemical devices include any devices in which electrochemical reactions occur. For example, the electrochemical device disclosed herein includes primary batteries, secondary batteries, fuel cells, solar cells and capacitors. In some embodiments, the electrochemical device disclosed herein is a lithium secondary battery, such as a lithium metal secondary battery, a lithium ion secondary battery, a lithium polymer secondary battery, and a lithium sulfur secondary battery.

The electrochemical device disclosed herein may be manufactured by a method known in the art. In one embodiment, an electrode assembly is formed by placing a separator of the present disclosure between a positive electrode and a negative electrode, and an electrolyte is injected into the electrode assembly. The electrode assembly may be formed by a process known in the art, such as a winding process or a lamination (stacking) and folding process.

Reference is now made in detail to the following examples. It is to be understood that the following examples are illustrative only and the present disclosure is not limited thereto.

Example 1

A certain amount of NMP was stirred in a planetary mixer with a revolution speed of 20 r/min and a self-rotation speed of 1500 r/min until the temperature of NMP reached 40° C. A certain amount of PVDF having an intrinsic viscosity of 0.9 mL/g (Solef 5130, purchased from Solvay) was added into the heated NMP to obtain a first mixture having a polymer content of 1.5 wt % relative to the total amount of the first mixture. The first mixture was stirred in the planetary mixer, specifically, revolving at a speed of 10 r/min for 5 minutes and then self-rotating at a speed of 500 r/min for 5-15 minutes. Then the first mixture was scraped and vacuum pumped to a vacuum degree of −0.05 MPa. Further, the first mixture was stirred with a revolution speed of 15 r/min and a self-rotation speed of 1500 r/min for one hour, during which the temperature of the first mixture was controlled not higher than 50° C. using circulating water. The first mixture was then vacuum pumped again to a vacuum degree of 0.01 MPa. A certain amount of alumina was added into the first mixture to obtain a second mixture having an alumina content of 3 wt % relative to the total amount of the second mixture. The second mixture was stirred in the planetary mixer, specifically, revolving at a speed of 10 r/min for 5 minutes and then self-rotating at a speed of 50 r/min for 5 minutes. Then the second mixture was scraped and vacuum pumped to a vacuum degree of −0.05 MPa. Further, the second mixture was stirred with a revolution speed of 10 r/min and a self-rotation speed of 50 r/min for one hour. The second mixture was vacuum pumped again to a vacuum degree ranging from 0 MPa to 0.01 MPa. The second mixture was then transferred to a high-efficiency dynamic shearing machine and was sheared for one hour. Then the sheared second mixture was passed through a sieve with a size ranging from 150 to 220 mesh to obtain a coating slurry.

A polypropylene (PP) membrane having a thickness of 12 μm was used as a base membrane. The coating slurry prepared above was coated on one surface of the PP membrane through a micro-gravure coating process at a speed of 5 m/min. The wet coating layer on one surface of the base membrane had a thickness of 1 μm. The coated PP membrane was placed in an oven of 80° C. to remove NMP through evaporation. And a single-surface coated separator was obtained.

A lithium-ion battery was prepared by placing the separator obtained above between a positive electrode (NCM111, i.e., Ni:Co:Mn=1:1:1) and a negative electrode (graphite), and injecting an electrolyte (1.15 mol/L LiPF$_6$ dissolved in a co-solvent of ethylene carbonate (EC):dimethyl carbonate (DMC):ethyl methyl carbonate (EMC)=2:4:4).

Example 2

A certain amount of NMP was stirred in a planetary mixer with a revolution speed of 25 r/min and a self-rotation speed of 2000 r/min until the temperature of NMP reached 45° C. A certain amount of PVDF having an intrinsic viscosity of 3.0 mL/g (HSV900, purchased from Arkema) was added into the heated NMP to obtain a first mixture having a polymer content of 2.0 wt % relative to the total amount of the first mixture. The first mixture was stirred in the planetary mixer, specifically, revolving at a speed of 15 r/min for 10 minutes and then self-rotating at a speed of 1000 r/min for 15 minutes. Then the first mixture was scraped and vacuum pumped to a vacuum degree of −0.05 MPa. Further, the first mixture was stirred with a revolution speed of 20 r/min and a self-rotation speed of 1500 r/min for one hour, during which the temperature of the first mixture was controlled not higher than 50° C. using circulating water. The first mixture was then vacuum pumped again to a vacuum degree of 0.01 MPa. A certain amount of alumina was added into the first mixture to obtain a second mixture having an alumina content of 5 wt % relative to the total amount of the second mixture. The second mixture was stirred in the planetary mixer, specifically, revolving at a speed of 10 r/min for 5 minutes and then self-rotating at a speed of 50 r/min for 5 minutes. Then the second mixture was scraped and vacuum pumped to a vacuum degree of −0.05 MPa. Further, the second mixture was stirred with a revolution speed of 10 r/min and a self-rotation speed of 50 r/min for two hours. The second mixture was vacuum pumped again to a vacuum degree ranging from 0 MPa to 0.01 MPa. The second mixture was then transferred to a high-efficiency dynamic shearing machine and was sheared for 1.5 hour. Then the sheared second mixture was passed through a sieve with a size ranging from 150 to 220 mesh to obtain a coating slurry.

A PE membrane having a thickness of 9 μm was used as a base membrane. The coating slurry prepared above was coated on two surfaces of the PE membrane through a micro-gravure coating process at a speed of 10 m/min. The wet coating layer on one surface of the base membrane had a thickness of 1.5 μm. The coated PE membrane was placed in an oven of 80° C. to remove NMP through evaporation. And a double-surface coated separator was obtained.

The same procedures as set forth above in Example 1 were used to prepare a lithium-ion battery.

Example 3

A certain amount of acetone was stirred in a planetary mixer with a revolution speed of 25 r/min and a self-rotation speed of 2000 r/min until the temperature of acetone reached 40-50° C. A certain amount of PVDF having an intrinsic viscosity of 0.9 mL/g (Solef 5130, purchased from Solvay) was added into the heated acetone to obtain a first mixture having a polymer content of 2.5 wt % relative to the total amount of the first mixture. The first mixture was stirred in the planetary mixer, specifically, revolving at a speed of 15 r/min for 10 minutes and then self-rotating at a speed of 1000 r/min for 15 minutes. Then the first mixture was scraped and vacuum pumped to a vacuum degree of −0.05 MPa. Further, the first mixture was stirred with a revolution speed of 20 r/min and a self-rotation speed of 1500 r/min for one hour, during which the temperature of the first mixture was controlled not higher than 50° C. using circulating water. Then the first mixture was vacuum pumped again to a vacuum degree of 0.01 MPa. A certain amount of boehmite (purchased from Shanghai Triquo Chemical Technology Co., Ltd.) was added into the first mixture to obtain a second mixture having a boehmite content of 10 wt % relative to the total amount of the second mixture. The second mixture was stirred in the planetary mixer, specifically, revolving at a speed of 10 r/min for 5 minutes and then self-rotating at a speed of 50 r/min for 5 minutes. Then the second mixture was scraped and vacuum pumped to a vacuum degree of −0.05 MPa. Further, the second mixture was stirred with a revolution speed of 10 r/min and a self-rotation speed of 50 r/min for two hours. Then the second mixture was vacuum pumped again to a vacuum degree ranging from 0 MPa to 0.01 MPa. The second mixture was then transferred to a high-efficiency dynamic shearing machine and was sheared for 1.5 hour. Then the sheared second mixture was passed through a sieve with a size ranging from 150 to 220 mesh to obtain a coating slurry.

A non-woven PET membrane having a thickness of 9 μm was used as a base membrane. The coating slurry prepared above was coated on one surface of the non-woven PET membrane through a micro-gravure coating process at a speed of 15 m/min. The wet coating layer had a thickness of 2 μm. The coated non-woven PET membrane was placed in an oven of 80° C. to remove acetone through evaporation. And a single-surface coated separator was obtained.

The same procedures as set forth above in Example 1 were used to prepare a lithium-ion battery.

Example 4

A certain amount of acetone was stirred in a planetary mixer with a revolution speed of 25 r/min and a self-rotation speed of 2000 r/min until the temperature of acetone reached 40-50° C. A certain amount of PVDF having an intrinsic viscosity of 2.2 mL/g (KYNAR PVDF 761A, purchased from Arkema) was added into the heated acetone to obtain a first mixture having a polymer content of 5 wt % relative to the total amount of the first mixture. The first mixture was stirred in the planetary mixer, specifically, revolving at a speed of 15 r/min for 10 minutes and then self-rotating at a speed of 1000 r/min for 15 minutes. Then the first mixture was scraped and vacuum pumped to a vacuum degree of −0.05 MPa. Further, the first mixture was stirred with a revolution speed of 20 r/min and a self-rotation speed of 1500 r/min for one hour, during which the temperature of the first mixture was controlled not higher than 50° C. using circulating water. Then the first mixture was vacuum pumped again to a vacuum degree of 0.01 MPa. A certain amount of zirconium dioxide was added into the first mixture to obtain a second mixture having a zirconium dioxide content of 15 wt % relative to the total amount of the second mixture. The second mixture was stirred in the planetary mixer, specifically, revolving at a speed of 10 r/min for 5 minutes and then self-rotating at a speed of 50 r/min for 5 minutes. Then the second mixture was scraped and vacuum pumped to a vacuum degree of −0.05 MPa. Further, the second mixture was stirred with a revolution speed of 10 r/min and a self-rotation speed of 50 r/min for two hours. Then the second mixture was vacuum pumped again to a vacuum degree ranging from 0 MPa to 0.01 MPa. The second mixture was then transferred to a high-efficiency dynamic shearing machine and was sheared for 1.5 hour. Then the sheared second mixture was passed through a sieve with a size ranging from 150 to 220 mesh to obtain a coating slurry.

A non-woven PP membrane having a thickness of 16 μm was used as a base membrane. The coating slurry prepared above was coated on one surface of the non-woven PP membrane through a micro-gravure coating process at a speed of 20 m/min. The wet coating layer had a thickness of 2.5 μm. The coated non-woven PP membrane was placed in an oven of 90° C. to remove acetone through evaporation. And a single-surface coated separator was obtained.

The same procedures as set forth above in Example 1 were used to prepare a lithium-ion battery.

Example 5

A certain amount of DMAC was stirred in a planetary mixer with a revolution speed of 25 r/min and a self-rotation speed of 2000 r/min until the temperature of DMAC reached 40-50° C. A certain amount of PVDF having an intrinsic viscosity of 3.0 mL/g (HSV900, purchased from Arkema) was added into the heated DMAC to obtain a first mixture having a polymer content of 10 wt % relative to the total amount of the first mixture. The first mixture was stirred in the planetary mixer, specifically, revolving at a speed of 15 r/min for 10 minutes and then self-rotating at a speed of 1000 r/min for 15 minutes. Then the first mixture was scraped and vacuum pumped to a vacuum degree of −0.05 MPa. Further, the first mixture was stirred with a revolution speed of 20 r/min and a self-rotation speed of 1500 r/min for one hour, during which the temperature of the first mixture was controlled not higher than 50° C. using circulating water. Then the first mixture was vacuum pumped again to a vacuum degree of 0.01 MPa. A certain amount of zirconium dioxide was added into the first mixture to obtain a second mixture having a zirconium dioxide content of 15 wt % relative to the total amount of the second mixture. The second mixture was stirred in the planetary mixer, specifically, revolving at a speed of 10 r/min for 5 minutes and then self-rotating at a speed of 50 r/min for 5 minutes. Then the second mixture was scraped and vacuum pumped to a vacuum degree of −0.05 MPa. Further, the second mixture was stirred with a revolution speed of 10 r/min and a self-rotation speed of 50 r/min for two hours. Then the second mixture was vacuum pumped again to a vacuum degree ranging from 0 MPa to 0.01 MPa. The second mixture was then transferred to a high-efficiency dynamic shearing machine and was sheared for 1.5 hour. Then the sheared second mixture was passed through a sieve with a size ranging from 150 to 220 mesh to obtain a coating slurry.

A non-woven PE membrane having a thickness of 16 μm was used as a base membrane. The coating slurry prepared above was coated on one surface of the non-woven PE membrane through a micro-gravure coating process at a speed of 50 m/min. The wet coating layer had a thickness of 3 μm. The coated non-woven PE membrane was placed in an oven of 100° C. to remove DMAC through evaporation. And a single-surface coated separator was obtained.

The same procedures as set forth above in Example 1 were used to prepare a lithium-ion battery.

Example 6

A certain amount of DMAC was stirred in a planetary mixer with a revolution speed of 25 r/min and a self-rotation speed of 2000 r/min until the temperature of DMAC reached 40-50° C. A certain amount of PVDF having an intrinsic viscosity of 3.0 mL/g (HSV900, purchased from Arkema) was added into the heated DMAC to obtain a first mixture having a polymer content of 20 wt % relative to the total amount of the first mixture. The first mixture was stirred in the planetary mixer, specifically, revolving at a speed of 15 r/min for 10 minutes and then self-rotating at a speed of 1000 r/min for 15 minutes. Then the first mixture was scraped and vacuum pumped to a vacuum degree of −0.05 MPa. Further, the first mixture was stirred with a revolution speed of 20 r/min and a self-rotation speed of 1500 r/min for one hour, during which the temperature of the first mixture was controlled not higher than 50° C. using circulating water. Then the first mixture was vacuum pumped again to a vacuum degree of 0.01 MPa. A certain amount of alumina was added into the first mixture to obtain a second mixture having an alumina content of 15 wt % relative to the total amount of the second mixture. The second mixture was stirred in the planetary mixer, specifically, revolving at a speed of 10 r/min for 5 minutes and then self-rotating at a speed of 50 r/min for 5 minutes. Then the second mixture was scraped and vacuum pumped to a vacuum degree of −0.05 MPa. Further, the second mixture was stirred with a revolution speed of 10 r/min and a self-rotation speed of 50 r/min for two hours. Then the second mixture was vacuum pumped again to a vacuum degree ranging from 0 MPa to 0.01 MPa. The second mixture was then transferred to a high-efficiency dynamic shearing machine and was sheared for 1.5 hour. Then the sheared second mixture was passed through a sieve with a size ranging from 150 to 220 mesh to obtain a coating slurry.

A PE membrane having a thickness of 9 μm was used as a base membrane. The coating slurry prepared above was coated on two surfaces of the PE membrane through a micro-gravure coating process at a speed of 80 m/min. The wet coating layer on each surface of the base membrane had a thickness of 1.5 μm. The coated PE membrane was placed in an oven of 100° C. to remove DMAC through evaporation. And a double-surface coated separator was obtained.

The same procedures as set forth above in Example 1 were used to prepare a lithium-ion battery.

Comparative Example 1

The same procedures as set forth above in Example 6 were used to prepare a double-surface coated separator, except that a PVDF having an intrinsic viscosity of 0.1 mL/g (purchased from Titan technology) was used.

The same procedures as set forth above in Example 1 were used to prepare a lithium-ion battery.

Comparative Example 2

The same procedures as set forth above in Example 6 were used to prepare a double-surface coated separator, except that a PVDF having an intrinsic viscosity of 4.5 mug (purchased from Titan technology) was used.

The same procedures as set forth above in Example 1 were used to prepare a lithium-ion battery.

Test 1 Intrinsic Viscosity of the Polymer

Intrinsic viscosity was determined by dissolving a small sample of polymer in a solvent and measuring the time required for 100 ml of the solution to flow through a capillary viscometer at a fixed temperature. The flow time was compared to that for a standard solvent under the same conditions. The intrinsic viscosity was calculated according to the formula shown above using the concentration and measured time.

Test 2 Adhesion of the Separator

The adhesion strength was tested according to GB/T 1040.3-2006, "Plastic-Determination of Tensile Properties—Part 3: Test conditions for films and sheets". The separator was cut into samples of 200 mm length and 25 mm width. Two samples were hot pressed (test side against test side) at 100° C. Then the adhesion strength was tested at the angle of 90 degree after hot pressing using a tensile testing machine.

Test 3 Cycle Performance of the Lithium-Ion Battery

Cycle performance of the lithium-ion battery was tested according to the following method. At room temperature, 100 cycles of charging at 0.5 C and discharging at 0.5 C were performed on the lithium-ion battery, and the capacity retention of the battery was calculated using the following formula:

capacity retention (%)=(capacity after 100 cycles/capacity before the cycle performance test at room temperature)×100%.

Table 1 summarizes the testing results of the separators and the lithium-ion batteries prepared according to Examples 1 to 6 and Comparative Examples 1 and 2.

The adhesion property of the separator may affect the interface contact between the separator and the positive electrode or the negative electrode, and may further affect the cycle performance of the lithium-ion battery employing the separator. Based on the testing results shown in Table 1, the coated separators having an adhesive strength in a range of from 10 to 25 N/m may result in a lithium-ion battery with good cycle performance. The testing results of Comparative Examples 1 and 2 indicate that separators having an adhesive force that is too low or too high may result in bad cycle performance of the lithium-ion battery.

The adhesive force of a coated separator may depend on the type of polymer used and the content of the polymer in the coating slurry. Based on the testing results shown in Table 1, when PVDF having an intrinsic viscosity ranging from 0.5 to 3.0 mL/g was used in the coating slurry, a coated separator having a preferred adhesive force ranging, for example, from 10 to 25 N/m, was obtained.

What is claimed is:

1. A coating slurry for preparing a separator of an electrochemical device, comprising:
    at least one polymer having an intrinsic viscosity ranging from 0.5 to 3.0 mL/g;
    at least one inorganic filler; and
    at least one solvent.

2. The coating slurry according to claim 1, wherein the content of the at least one polymer in the coating slurry ranges from 1 wt % to 25 wt % relative to the total weight of the coating slurry.

TABLE 1

Testing Results

| # | Item | Example 1 | Example 2 | Example 3 | Example 4 | Example 5 | Example 6 | Comparative Examples 1 | Comparative Examples 2 |
|---|---|---|---|---|---|---|---|---|---|
| 1 | Base membrane | PP | PE | Non-woven PET | Non-woven PP | Non-woven PE | PE | PE | PE |
| 2 | Thickness of the base membrane (μm) | 12 | 9 | 9 | 16 | 16 | 9 | 9 | 9 |
| 3 | Polymer content in the coating slurry (%) | 1.5 | 2 | 2.5 | 5 | 10 | 20 | 20 | 20 |
| 4 | Intrinsic viscosity of the polymer (mL/g) | 0.9 | 3.0 | 0.9 | 2.2 | 3.0 | 3.0 | 0.2 | 3.5 |
| 5 | Solvent | NMP | NMP | Acetone | Acetone | DMAC | DMAC | DMAC | DMAC |
| 6 | Inorganic filler | $Al_2O_3$ | $Al_2O_3$ | Boehmite | $ZrO_2$ | $ZrO_2$ | $Al_2O_3$ | $Al_2O_3$ | $Al_2O_3$ |
| 7 | Inorganic filler content in the coating slurry (%) | 3 | 5 | 10 | 15 | 15 | 15 | 15 | 15 |
| 8 | Thickness of the wet coating layer | 1 | 1.5 + 1.5 | 2 | 2.5 | 3 | 1.5 + 1.5 | 1.5 + 1.5 | 1.5 + 1.5 |
| 9 | Coating surfaces of the base membrane | Single surface | Double surfaces | Single surface | Single surface | Single surface | Double surfaces | Double surfaces | Double surfaces |
| 10 | Adhesive force (N/m) | 10 | 15 | 18 | 22 | 25 | 16 | 8 | 28 |
| 11 | Capacity retention after 100 cycles (base membrane) | 90 | 93 | 87 | 86 | 86 | 93 | 80 | 81 |
| 12 | Capacity retention after 100 cycles (prepared separator) | 95 | 97 | 92 | 94 | 86 | 98 | 81 | 78 |

As shown in Table 1, the lithium-ion batteries prepared using the coated separators prepared in Examples 1-6 had higher capacity retention rates after 100 cycles comparing with the lithium-ion batteries prepared in Comparative Examples 1 and 2.

3. The coating slurry according to claim 1, wherein the content of the at least one inorganic filler in the coating slurry ranges from 1 wt % to 50 wt % relative to the total weight of the coating slurry.

4. The coating slurry according to claim 1, wherein the at least one polymer and the at least one inorganic filler present in the coating slurry in a weight ratio ranging from 2:1 to 1:50.

5. The coating slurry according to claim 1, wherein the at least one polymer is chosen from polyvinylidene fluoride, polyvinylidene fluoride-co-hexafluoropropylene, and polyvinylidene fluoride-co-tetrafluoroethylene.

6. The coating slurry according to claim 1, wherein the at least one inorganic filler is chosen from oxides, hydroxides, sulfides, nitrides, carbides, carbonates, sulfates, phosphates and titanates comprising at least one of metallic and semiconductor elements.

7. The coating slurry according to claim 6, wherein the at least one of metallic and semiconductor elements is chosen from Si, Al, Ca, Ti, B, Sn, Mg, Li, Co, Ni, Sr, Ce, Zr, Y, Pb, Zn, Ba, and La.

8. The coating slurry according to claim 1, wherein the at least one inorganic filler is chosen from alumina, boehmite, silica, zirconium dioxide, titanium oxide, cerium oxide, calcium oxide, zinc oxide, magnesium oxide, lithium nitride, calcium carbonate, barium sulfate, lithium phosphate, lithium titanium phosphate, lithium aluminum titanium phosphate, cerium titanate, calcium titanate, barium titanate, and lithium lanthanum titanate.

9. The coating slurry according to claim 1, wherein the at least one inorganic filler has a particle size ranging from 0.1 to 20 μm.

10. The coating slurry according to claim 1, wherein the at least one solvent is chosen from N-methyl pyrrolidone, dimethylacetamide, N,N-dimethylformamide, dimethyl sulfoxide, acetone, diethyl ether, propyl ether, cyclohexane and tetrahydrofuran.

11. A method for preparing the coating slurry of claim 1, comprising:
preparing a mixture comprising the at least one polymer, the at least one inorganic filler, and the at least one solvent whose temperature ranges from 40° C. to 50° C.; and
shearing the mixture.

12. The method according to claim 11, wherein the mixture is prepared by:
adding the at least one polymer into the at least one solvent whose temperature ranges from 40° C. to 50° C. to obtain a first mixture; and
adding the at least one inorganic filler into the first mixture to obtain a second mixture.

13. The method according to claim 11, wherein the mixture is prepared by:
adding the at least one polymer into the at least one solvent whose temperature ranges from 40° C. to 50° C. to obtain a first mixture;
vacuum pumping the first mixture;
adding the at least one inorganic filler into the first mixture to obtain a second mixture; and
vacuum pumping the second mixture.

14. A method according to claim 11, further comprising:
passing the mixture through a sieve with a size ranging from 150 to 220 mesh after shearing the mixture.

15. A method for preparing a separator of an electrochemical device, comprising:
preparing the coating slurry of claim 1;
applying the coating slurry on at least one surface of a porous base membrane to form a wet coating layer; and
removing the at least one solvent from the wet coating layer to form a coating layer.

16. The method according to claim 15, wherein the porous base membrane comprises a polyolefin-based porous membrane or a non-woven membrane.

17. The method according to claim 15, wherein the porous base membrane has a thickness ranging from 3 to 20 μm.

18. The method according to claim 15, wherein the coating layer on one surface of the porous base membrane has a thickness ranging from 1 to 5 μm.

19. A separator for an electrochemical device prepared by the method of claim 15.

20. An electrochemical device comprising a positive electrode, a negative electrode, and a separator of claim 19 interposed between the positive electrode and the negative electrode.

* * * * *